Patented May 1, 1923.

1,453,797

UNITED STATES PATENT OFFICE.

FREDERICK W. HUBER, OF RIVERSIDE, CALIFORNIA, ASSIGNOR, BY MESNE ASSIGNMENTS, TO WESTERN PRECIPITATION COMPANY, A CORPORATION OF CALIFORNIA.

PROCESS OF OBTAINING SOLUBLE POTASSIUM COMPOUNDS IN THE MANUFACTURE OF CEMENT.

No Drawing.   Application filed December 15, 1917.   Serial No. 207,367.

*To all whom it may concern:*

Be it known that I, FREDERICK W. HUBER, a citizen of the United States, residing at Riverside, in the county of Riverside and State of California, have invented certain new and useful Improvements in Processes of Obtaining Soluble Potassium Compounds in the Manufacture of Cement, of which the following is a specification.

The present invention relates to the production and recovery of soluble potassium compounds in the manufacture of Portland cement from potassiferous materials, the object of the invention being to recover as large a proportion as possible of the potassium compounds contained in the cement raw mix, in a water-soluble condition, in which they are readily salable.

The production of potassium compounds by the collection and subsequent treatment of flue dust obtained in the manufacture of Portland cement has already been investigated to some extent and a number of patents have been taken out by various inventors, looking to this end. Portland cement is ordinarily made from materials containing more or less potassium, the potassium compounds being usually in an insoluble condition in the raw mix. In the calcination and clinkering of the cement-making raw materials, a considerable amount of the potassium compounds contained therein is driven off by the heat, and a part of these compounds are collected with the flue dust.

Experiments have clearly demonstrated that the potassium compounds as volatilized by heating the materials, for example in a coal-fired rotary kiln, at the time of their liberation, are substantially entirely in a water-soluble state. These compounds however, do not entirely remain in a water-soluble condition in the collected flue dust. It appears possible that the soluble potassium compounds may react more or less with the coal ash present in the kiln gases, and produce compounds thereby which are not readily soluble, thereby losing a part, and in some instances a very large part of the soluble potassium compounds. In ordinary practice the kiln is fired by a blast of coal dust introduced at the lower end of the kiln, with a blast of air, thereby producing a flame which travels upwardly through the kiln, a rotary kiln being employed. The tendency of the ash from the coal dust is accordingly to travel toward the stack, and the potassium compounds being volatilized and traveling in the same direction, are brought into more or less intimate contact with the coal ash, and perhaps by reaction between these two materials a silicious, more or less glassy mass is produced, in a finely divided state. This product of reaction of the coal ash and potassium compounds settles out with the flue dust, and is not readily amenable to treatment with either hot or cold water.

I have found by experimentation that if the cement flue dust, containing insoluble potassium compounds (either before or after leaching with water) be mixed with an amount of carbon, for example coal dust, substantially equal in weight to the $K_2O$ content of the flue dust, and also be mixed with calcareous material, for example lime or chalk, in such proportions as to produce a mixture having a $CaO:SiO_2$ ratio of about 2:1, and preferably not less than 2:1, a mass is produced which by heating, for example in a rotary kiln, to a temperature between 600–1000° C., produces a product in which substantially the entire content of potassium compounds is rendered water-soluble, and can be separated by leaching with water.

The $CaO:SiO_2$ ratio is preferably about 2:1. That is to say the amount of calcium present (existing as lime or other calcium compound) is such as to furnish two molecules of $CaO$ for each molecule of silica present (existing either as such or in the form of silicates, etc.).

To this end, the flue dust collected by any of the ordinary methods, for example by cyclone dust separators, electrical precipitation, cooling and settling by greatly reducing the speed of the flue gases, or by a wet treatment of the flue gases, or other method, is mixed with coal and lime (or other carbonaceous and calcareous materials) the amount of coal added being at least equal (and usually slightly more than) the weight of the total $K_2O$ content of the flue dust. This mass is then transferred to a kiln or furnace and heated to a temperature of 600–1000° C. The heating may be effectively carried out in a rotary kiln, and should be to a temperature below that at which any very considerable amount of the potassium compounds would be fumed off. The furnaced mass is then leached with water, hot water being preferred, and the solution separated from the insoluble matter, and the solution subsequently evaporated to recover the potassium compounds.

The flue dust as originally obtained may contain considerable calcareous material, or may contain considerable finely divided carbon, and the content of these materials may of course be taken into consideration in determining the amounts of carbon and lime to be added to the flue dust in producing the mixture to be heated. It is accordingly obvious that if either or both the lime and carbon are sufficient, it is not necessary to add further quantities.

The original flue dust, before mixing with lime and coal or the like, may be leached with water to remove soluble potassium compounds, if so desired. This treatment leaves a wet mass of flue dust which may be ground with the lime and coal either in a wet state or after drying.

What I claim is:

1. A process of producing water-soluble potassium salts which comprises burning a potassiferous cement-making raw mix, and collecting flue dust containing potassium compounds not readily soluble in water, producing therefrom a mixture containing such not-readily-soluble-potassium compounds, and calcareous material having a $CaO:SiO_2$ ratio of not less than 2:1, and containing carbonaceous material of a reducing character, at least about equal in amount to the $K_2O$ content, and heating the mixture, to a temperature of at least 600° C., but below the temperature at which any large part of the potassium compounds would be volatilized, and thereafter extracting the readily soluble potassium compounds therefrom.

2. A process of producing water-soluble potassium compounds from cement kiln flue dust and like material which comprises producing a mixture containing such dust, calcareous material and carbonaceous material of a reducing character, the mixture containing a molecular ratio of $CaO:SiO_2$ equal to about 2:1, and containing a carbonaceous reducing agent at least equal to the weight of actual $K_2O$ present, heating such dust to a temperature of about 600 to 1000° C., under reducing conditions and thereafter leaching the heated mass with water.

3. A process which comprises heating a pulverulent mixture containing cement flue dust, calcareous material and carbonaceous material of a reducing character, the mixture containing a molecular ratio of $CaO:SiO_2$ equal to about 2:1, and containing a carbonaceous reducing agent at least equal to the weight of actual $K_2O$ present to at least a red heat, but below that at which large quantities of the potassium content thereof would be lost by vaporization, while maintaining the heated material under reducing conditions, and thereafter leaching the same.

4. A process which comprises burning potassiferous cement-forming material by a flame of fine coal, collecting the flue dust, and producing a mixture of at least that portion of such dust in which the potassium content is not readily water-soluble, with calcareous material and carbonaceous material, said mixture having a $CaO:SiO_2$ ratio of not less than about 2:1, and containing at least as much free carbon as $K_2O$ by weight, burning such mixture at not below redness but below the temperature at which a substantial part of the potassium compounds would be volatilized, and removing the water-soluble potassium compounds therefrom.

5. A process which comprises heating a mixture containing potassiferous cement flue dust, calcareous material and carbonaceous material of a reducing character, such latter being present in amount at least substantially equal to the $K_2O$ content of the dust, and such heating being to a temperature corresponding to at least a red heat, but below that at which large quantities of the potash content of the dust would be lost by vaporization, and thereafter leaching the same.

In testimony whereof I affix my signature.

FREDERICK W. HUBER.